United States Patent
Nagarajan

(10) Patent No.: US 8,184,326 B2
(45) Date of Patent: May 22, 2012

(54) INFORMATION DISSEMINATION MULTIFUNCTION DEVICE

(75) Inventor: Ramesh Nagarajan, Pittsford, NY (US)

(73) Assignee: Xerox Corpoaration, Norwalk, CT (US)

( * ) Notice: Subject to any disclaimer, the term of this patent is extended or adjusted under 35 U.S.C. 154(b) by 977 days.

(21) Appl. No.: 11/157,916

(22) Filed: Jun. 22, 2005

(65) Prior Publication Data

US 2006/0290970 A1 Dec. 28, 2006

(51) Int. Cl.
| G06K 15/00 | (2006.01) |
| G06F 3/12 | (2006.01) |
| G06F 21/00 | (2006.01) |
| G06F 15/16 | (2006.01) |
| G06F 7/00 | (2006.01) |
| G06F 17/30 | (2006.01) |
| H04N 1/32 | (2006.01) |
| H04N 1/40 | (2006.01) |
| H04L 9/32 | (2006.01) |

(52) U.S. Cl. ...... 358/1.16; 358/1.15; 358/442; 358/444; 358/1.17; 358/1.18; 713/182; 713/169; 707/705; 707/781; 707/783; 707/785; 707/711; 709/211

(58) Field of Classification Search ............ 358/1.18, 358/403; 382/305
See application file for complete search history.

(56) References Cited

U.S. PATENT DOCUMENTS

| 5,163,088 | A | * | 11/1992 | LoCascio ............... 379/93.02 |
| 5,629,770 | A | * | 5/1997 | Brassil et al. ............ 358/426.12 |
| 6,366,915 | B1 | * | 4/2002 | Rubert et al. ............... 707/770 |
| 6,378,070 | B1 | * | 4/2002 | Chan et al. ................. 713/155 |
| 6,424,429 | B1 | * | 7/2002 | Takahashi et al. ......... 358/1.16 |
| 6,583,888 | B1 | * | 6/2003 | Salgado et al. ............ 358/1.15 |
| 6,591,367 | B1 | * | 7/2003 | Kobata et al. ............... 726/31 |
| 6,731,447 | B2 | * | 5/2004 | Bunker et al. ............... 360/60 |
| 6,862,103 | B1 | * | 3/2005 | Miura et al. ............... 358/1.15 |
| 7,035,830 | B1 | * | 4/2006 | Shaikh ......................... 705/52 |
| 7,302,580 | B2 | * | 11/2007 | Koizumi ..................... 713/183 |
| 7,304,759 | B2 | * | 12/2007 | Kiyono et al. ............. 358/1.15 |
| 7,487,366 | B2 | * | 2/2009 | Umebayashi et al. ...... 713/193 |
| 7,495,792 | B2 | * | 2/2009 | Snowdon et al. .......... 358/1.16 |
| 7,555,769 | B1 | * | 6/2009 | Shapiro et al. ............... 726/1 |
| 7,652,679 | B2 | * | 1/2010 | Aratani et al. ............. 345/629 |
| 7,688,466 | B2 | * | 3/2010 | Manchester ............... 358/1.15 |
| 7,725,490 | B2 | * | 5/2010 | Hitchen et al. ............ 707/783 |
| 7,882,559 | B2 | * | 2/2011 | Imai ............................ 726/21 |
| 7,884,954 | B2 | * | 2/2011 | Endoh ...................... 358/1.15 |
| 8,095,949 | B1 | * | 1/2012 | Hendricks et al. .......... 725/29 |
| 2003/0144903 | A1 | * | 7/2003 | Brechner et al. .......... 705/14 |
| 2003/0145218 | A1 | * | 7/2003 | Hutchison .................. 713/200 |
| 2004/0150855 | A1 | * | 8/2004 | Tonegawa .................. 358/1.15 |
| 2005/0007619 | A1 | * | 1/2005 | Minato ...................... 358/1.14 |
| 2006/0002614 | A1 | * | 1/2006 | LeHenaff ................... 382/242 |
| 2007/0192385 | A1 | * | 8/2007 | Prahlad et al. .............. 707/202 |

* cited by examiner

Primary Examiner — Hilina S Kassa
(74) Attorney, Agent, or Firm — Pillsbury Winthrop Shaw Pittman LLP

(57) ABSTRACT

An information dissemination system that obtains information from a multifunction document production device that is programmed to store documents along with user provided dissemination level authorizations and with one or more keywords extracted from the document, and to disseminate such documents according to persons authorized to receive the documents based on prior and real time inquiries of a requestor, with a knowledge agent matching the extracted keywords against the queries.

20 Claims, 2 Drawing Sheets

INFORMATION DISSEMINATION MULTIFUNCTION DEVICE

BACKGROUND

All references cited in this specification, and their references, are incorporated by reference herein where appropriate for teachings of additional or alternative details, features, and/or technical background.

Disclosed in the embodiments herein is an information dissemination system comprising a multifunction document production device.

Streamlined systems for obtaining needed information are continually being sought. With the advent of the Internet, people have gained a useful avenue for fulfilling their information needs. The Internet has created an explosion of valuable information, which makes it easier for users to find and obtain information. Unfortunately, information searches on the Internet suffer from an overload of irrelevant information, and typically only access public sites. In the work environment, however, a considerable amount of the information needed for streamlining a job function is not publicly available but is scrupulously vaulted in the company or institution. While fire-walled private server sites may be accessed by authorized persons through the Internet for seeking private information (as opposed to public information), information needed for the efficient conduct of one's job, is often stored on paper or other medium in the possession of third parties. Extra time and effort are needed to make the information available through the fire-walled server.

Multifunction digital copiers and printers are now common in the office equipment industry. Whereas traditional "analog" or "light-lens" copiers, available for many decades, in effect take a photograph of a hard-copy document desired to be copied, a digital copier first converts the original images to a set of digital data which is retained in a memory. Multifunction digital copiers may allow for digital input from a computer to provide for prints to be made directly. At a later time, the digital data is used to print out copies based on the original documents. The digital copies can be exact copies of the original documents, or the data can be manipulated in various ways to create prints based on the original data. Temporary storage of the image data in memory provides an opportunity for the image data to be altered for various reasons, such as "cleaning up" the image; enlarging or reducing the image; shifting or inverting the image; inserting variable data, etc. The temporary storage of the data also facilitates exporting the image data from the copier in electronic form, such as for electronic archiving purposes.

Many photocopiers, printers, and other reproduction and printing devices now include non-volatile memory (NVM), such as magnetic and optical storage media and including removable disk systems, hard drives, and other storage media systems allowing the device and/or a user to store a job the device uses or is directed to use the stored job. The data is retrievable by way of pointers and/or directory information that allow the device to locate the data. The currently prevalent method of deleting a file is to delete the pointers and/or directory information that allows the device to locate the data; the document images/data files themselves are still resident in the NVM.

Sharing of information in today's office environment is becoming more and more challenging. Information is generated and passed along in an office environment on a daily basis in hardcopy and electronic formats. It is faxed, copied, printed, and/or emailed to exchange information among co-workers. This is not the most efficient workflow for sharing information in a networked environment.

Considerable effort has been taken in the past to clear storage of data in the memory of multifunction devices after a period of time, typically after print-out of a copy or document. Such effort has been undertaken in part with security risks in mind—that the "abandoned" data still resident in memory could be hacked and accessed by a hostile party, either by electronic means or even physically by taking the device.

Another possible consideration may be in clearing storage that has been the system used to store documents for later retrieval, which may imply indexing the documents by a name or key entered by the user of the multifunction device or generated by the device, leading over time to a difficulty for users to find their documents among a large number of documents that may be similarly named or numbered.

There has been little recognition that the stored data in a multifunction device might have use beyond its subsequent use by the user to print a copy of the information.

REFERENCES

U.S. Pat. No. 6,731,447, commonly assigned, discloses a process that ensures the destruction of data files a user wishes to completely erase from a storage medium, such as a hard drive or removable disk. A system administrator can select a quantity of and pattern to be used in overwrites of the data file so that no one can recover the data from the storage medium.

U.S. Patent Application Publication No. US 2003/0145218 A1 (U.S. patent application Ser. No. 10/059,494), commonly assigned, discloses a digital copier wherein hardcopy original images are scanned and retained as digital data in a memory and subsequently digitally printed out as copies, original data is encrypted before being stored in the memory, and then decrypted incidental to printing or other export. Data stored within a digital copier is thus protected from being hacked or otherwise accessed. Keys for encryption or decryption are stored external to the copier.

U.S. Patent Application Publication No. US 2003/0144903 A1 discloses a centralized information dissemination system automatically distributes information received from information disseminators to information requesters. Information disseminators may register with a central facility to obtain an information address and to submit materials that are to be associated with the information address. Information disseminators may publish the information address to inform the public of the availability of the information distribution system. An information requester may send a message addressed to a published information address at the central facility to automatically receive information. The central facility may respond to the message by sending a reply message that includes materials submitted by an information disseminator.

SUMMARY

Aspects disclosed herein include:

a system comprising a multifunction device capable of producing a copy of a document, the multifunction device programmed to store document copies, to associate input with respect to distribution authorization of the document with the stored document copy, to extract subject matter from the document, to index extracted subject matter from the document with the particular document, to create an electronic output in response to an extemporaneous or prior query pertaining to the subject matter of the document wherein the electronic output comprises information contained within the document, and to transmit the electronic output to the source of the query;

a method for providing information inputted by the user into a multifunction device to persons authorized to review such information, the method comprising (a) digitally storing information inputted by a user with an authorized distribution; (b) extracting subject matter from the information; (c) indexing the information with the extracted subject matter and storing the indexed information in a storage unit; (d) creating an electronic output from the information in the storage unit in response to a query pertaining to the extracted subject matter; and (e) transmitting the electronic output to the source of the query if the source of query is within the authorized distribution; and a multifunction device comprising a document scanner for scanning a document and converting the same to digital data form; a digital processing unit in communication with the document scanner; a storage unit in association with the digital processing unit capable of storing the document in digital data form; a program instruction set associated with the digital processing unit causing extraction of digital subject information from the document scanned by the document scanner and indexing the digital data form of the document with the extracted digital subject information in the storage unit; and further causing output of the digital data form of the document in response to a query for information pertaining to the extracted subject matter.

BRIEF DESCRIPTION OF THE DRAWINGS

Various of the above mentioned and further features and advantages will be better understood from this description of embodiments thereof, including the attached drawing figures wherein.

DETAILED DESCRIPTION

Figure 1:
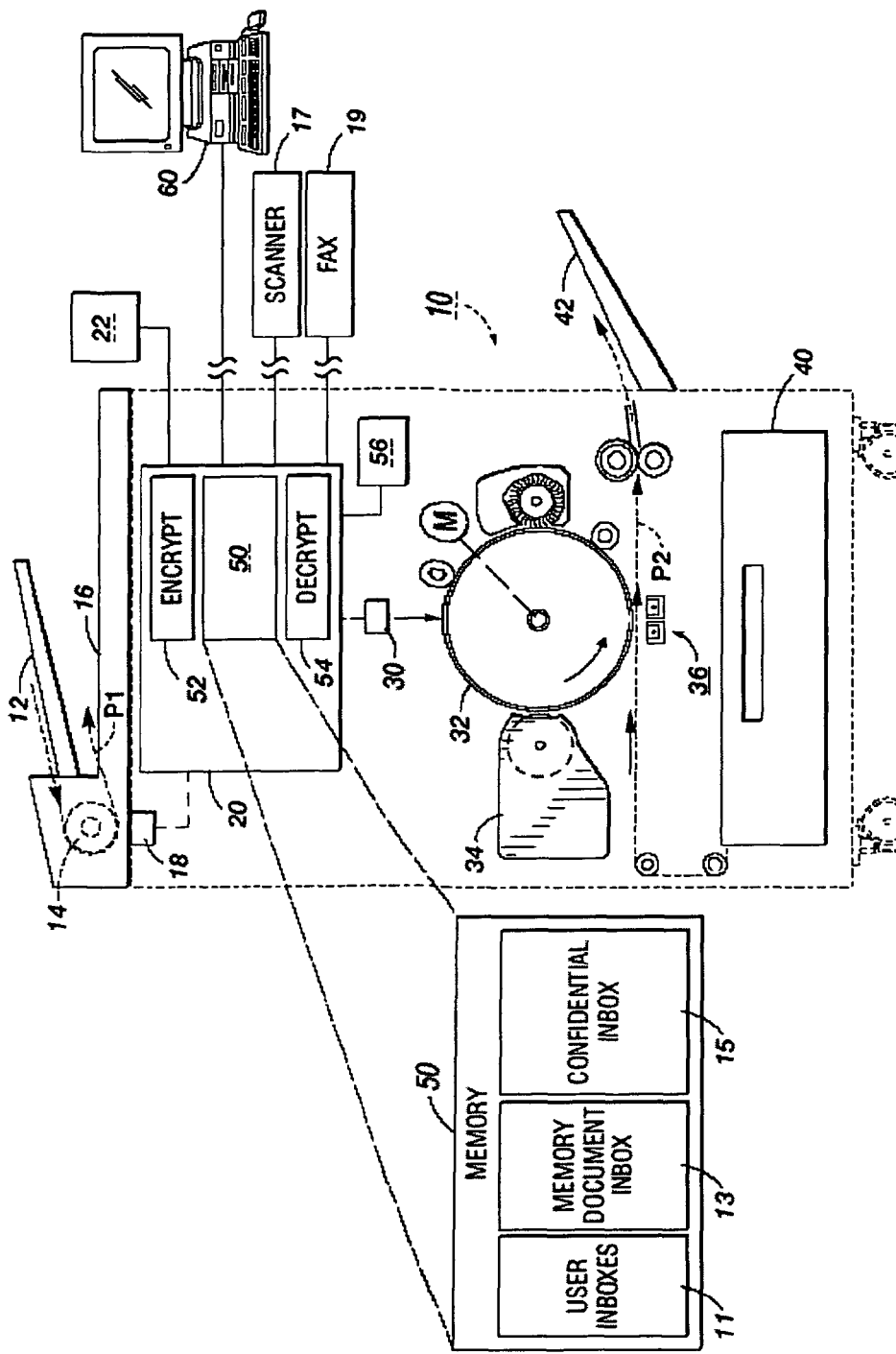
FIG. 1 shows a simplified elevation view of a digital multifunction device embodiment allowing for printing, copying, faxing, and scanning.

In embodiments there is illustrated an information dissemination system that obtains information from a multifunction document production device that is programmed to store documents along with user provided dissemination level authorizations and with one or more keywords extracted from the document, and to disseminate such documents according to persons authorized to receive the documents based on prior and real time inquiries of a requester, with a knowledge agent matching the extracted keywords against the queries.

In such embodiment, the multifunction device stores the document rather than just storing pointers to the document stored elsewhere. In this regard, the multifunction device may be said to be acting as a server. Input of the document and extraction of the subject matter may employ OCR scanning (to ASCII characters) in conjunction with an extraction program. In this manner, the embodiments of the present invention do not need to rely on centralized facilities to provide access and/or distribute such information.

In another embodiment, there is described a method for automated information dissemination from a multifunction device. In such method, automated workflow disseminates documents based on program extracted keywords or subject matter, or keywords/subject matter entered by the person inputting the original information (such as a document into the multifunction device and an authorized distribution list provided by such person, a third party, or inherently programmed into the system) by automating the dissemination of documents to persons authorized to receive the document. Such method improves knowledge-worker productivity.

The multifunction device of the present disclosure may help automate some information flow between co-workers. Users of the device may store hardcopy, electronic, imaged or other types of information convertible to, or comprising, digital data in the multifunction device. Storage may be in some common data or image format.

In one embodiment, an OCR engine within the multifunction device uses idle time to extract keywords from the stored documents. Users interested in the free flow of information may obtain the same by an extemporaneous query sent to the multifunction device or by logging a query containing interest in such subject matter prior to the information, such as a keywords, being inputted into the multifunction device. If a prior query and distribution authorization is indexed to information, the information may be directly sent to the persons making the query or sent only after confirming such prior distribution authorized from the person inputting the information.

Also, in situations where users storing digital data, authorize the dissemination of the information, new information, such as, for example, new documents, is stored in a digital data storage unit in the multifunction device, and keywords/subject matter are extracted from the information. This way, a knowledge agent may match the extracted keywords against the queries and transmit the appropriate information/document to all interested parties through a transfer protocol selected by the interested parties. This is performed, if and only if, the user storing the digital data authorizes for dissemination of the information.

In addition, some multifunction devices employ store and recall features. Such features provide a mechanism in which users can store a document and then retrieve the documents for later use.

It will be appreciated that having such features enable the multifunction devices of the present invention to access a repository of stored information, thereby enhancing flexibility to access information from various sources.

In an embodiment, distribution of the information is limited to individuals and/or groups which the inputter of the information authorizes to view and/or edit.

The information disseminated may be in encrypted code, requiring a decryption key at the point to which it is disseminated for reading. A password based system may alternatively be employed or used in conjunction with decryption of an encrypted code. If encryption is utilized, the encryption/decryption keys may be located remotely from or within the multifunction device. Storage of the information on the multifunction device may also be in encrypted form. Decryption keys may be stored proximal or distal to the information encryption site.

Dissemination of information may be local to or distant from the multifunction device. The authorized distribution input may require storage of the information/document on a secure or non-secure (as when it is freely publicly available) searchable database. The information may be text-based, image-based, text-image based, sound or any other sensory-perceptible information.

Disseminated information may be by way of secured inbox on the requestor's side, or by other means such as by email. An image on the requestor's computer may be used to indicate the subject matter of the disseminated information.

The query may be text based, such as text related to the subject matter sought to be disseminated, or may be image based (e.g., an image that is found in a digitally scanned document). When an image query is made, the system may search for the image, taking into account color schematics, contours, and patters. An image based query searching the indexed extracted subject matter by be images.

In yet another embodiment, there is disclosed a system comprising a multifunction device capable of producing a copy of a document, the multifunction device programmed to store document copies; associating input with respect to distribution authorization of the document with the stored document copy; extracting subject matter from the document to index extracted subject matter from the document with the particular document; creating an electronic output in response to an extemporaneous or prior query pertaining to the subject matter of the document wherein the electronic output comprises information contained within the document; and transmitting the electronic output to the source of the query.

Now turning to the figures, FIG. 1 shows a simplified elevation view of a digital multifunction device 10. Such multifunction device 10 has scanning and printing functions within the device and may react to user interface 22 input or remote input, for example, from computer 60, scanner 17, or fax 19.

Original sheets, bearing images to be copied, are placed on an input tray 12, where they are automatically fed by generally known means such as a document handler including a roll 14, and then placed in catch-tray 16. While each sheet is moved on roll 14 through what can be called a scanner process direction P1, successive small areas on the sheet are illuminated and recorded by a linear photosensor array 18

The resulting image data is retained in what is here called a "computer" 20, which in a practical embodiment is a board comprising any number of processors, memory devices, etc., as is generally familiar in digital copiers. The computer 20 retains image data collected in the scanning process, and holds it temporarily until the image data is used to print copies. The computer may also be associated with a user interface (UI) 22 at the copier to receive instructions.

In a digital copier using a xerographic "laser printer" to create images, the computer 20 ultimately operates hardware including a laser 30 which is used to discharge areas on a photoreceptor 32 in accordance with a page image desired to be printed. The resulting electrostatic latent image is then developed with marking material at developer station 34. Blank sheets are then drawn one at a time from a stack 40 and moved through process direction P2, and the marking material on the photoreceptor 32 is transferred to each sheet at transfer station 36. The output prints are then deposited in a tray 42, which may have associated therewith any number of finishing devices such as a stapler or folder (not shown).

The computer 20 on board the copier 10 includes what is here generally called a memory 50. This memory 50, which may in a practical embodiment include any number of memory chips and associated circuitry and software, retains image data from original images from the scanner hardware, until the data is caused to operate the printer hardware to output prints. The memory may include one or more electronic compartments, such as, for example, "User Inboxes" 11, "Memory Document Inbox" 13, and "Confidential Inbox" 15.

Associated with memory 50, may be what is called an "encrypt" device 52 and a "decrypt" device 54. As can be seen, the encrypt device 52 encrypts image data entering the memory 50 from the scanner hardware, and decrypt device 54 decrypts the data in memory 50 so that it may be used to output prints. The effect is that all image data, in whatever format, retained in memory 50 is encrypted.

Figure 2:
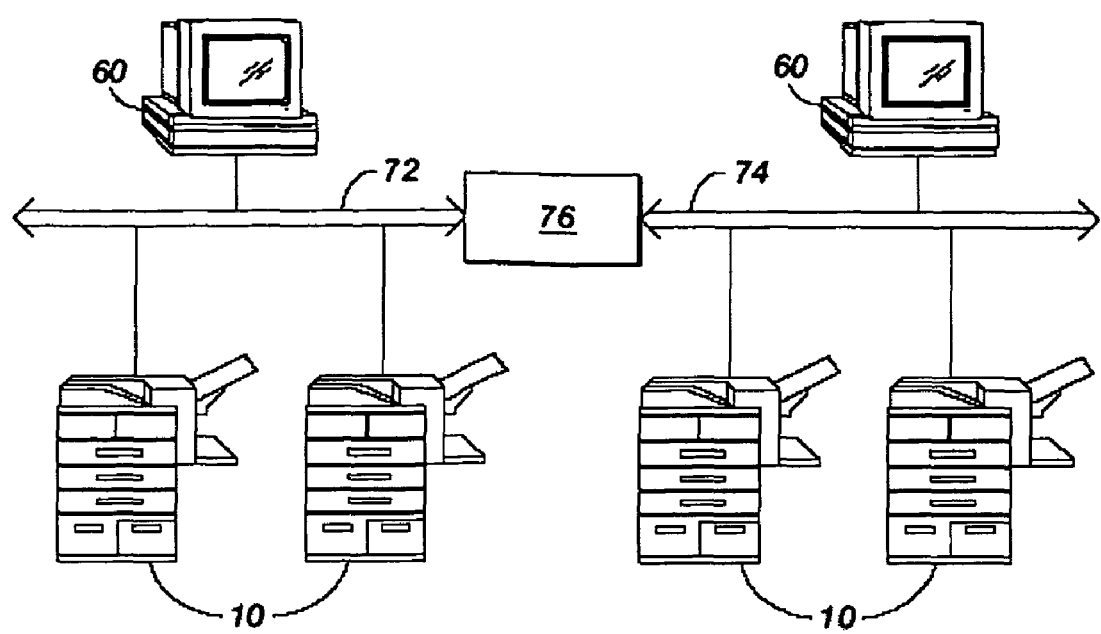
FIG. 2 shows a diagram of a set of digital multifunction devices connected to computers arranged on a network.

As shown in FIG. 2, more than one multifunction device 10 may be used to provide information to a plurality of external computers 60 associated with authorized users through known means such as one or more subnetworks 72, 74 connected through a router 76. Each of computer 60 and/or multifunction device 10 may retain encryption/decryption keys.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising a multifunction device, wherein the multifunctional device is configured to:
   produce a copy of a document, said multifunction device programmed to store electronic document copies in a memory;
   receive an input from a user at the time of producing the copy of the document that associates an electronic distribution authorization of the document with the stored document copy to limit access thereto, wherein the electronic distribution authorization limits distribution of the copy to individuals and/or groups the user authorizes to view and/or edit the copy;
   extract subject matter from such document;
   index at least extracted image subject matter from the document with the particular document;
   create an electronic output in response to an image query pertaining to the image subject matter of said document wherein the electronic output comprises information contained within the document, the query or output being limited to individuals having distribution authorization, wherein image querying indexed image subject matter comprises taking into account color schematics, contours, and patterns; and
   transmit the electronic output to the source of the query.

2. The system in accordance with claim 1 wherein said multifunction device comprises a digital copier.

3. The system in accordance with claim 2 wherein said multifunction device further comprises a digital printer.

4. The system in accordance with claim 1 wherein said input with respect to distribution authorization includes user input pertaining to one or more groups authorized to view a particular document.

5. The system in accordance with claim 1 wherein said output in response to said query is the document itself.

6. The system in accordance with claim 1 wherein said output in response to said query is in encrypted form.

7. The system in accordance with claim 1 wherein said storage of document copies is in encrypted form.

8. The system in accordance with claim 7 wherein an encryption key configured to decrypt said encrypted form, is stored in a processor system remote to said multifunction device.

9. The system in accordance with claim 7 wherein an encryption key configured to decrypt said encrypted form is stored in the multifunction device.

10. The system in accordance with claim 1 wherein said subject matter extracted from the document further comprises text information.

11. The system in accordance with claim 1 wherein said subject matter used to query the device further comprises text information.

12. The system in accordance with claim 1 wherein said storage of document copies is in a secure storage device.

13. A method for providing information inputted by the user into a multifunction device to persons authorized to review such information, said method comprising:
   producing a copy of a document, said multifunction device configured to store electronic document copies in a memory;
   digitally storing information inputted by a user at the time of producing the copy of the document with an electronic authorized distribution to limit access to the stored document copy, wherein the electronic distribution authorization limits distribution of the copy to individuals and/or groups the user authorizes to view and/or edit the copy;
   extracting at least image subject matter from said information;
   indexing said information with said extracted image subject matter, and storing the indexed information in a storage unit;
   creating an electronic output from said information in said storage unit in response to an image query pertaining to the extracted image subject matter, the query or output being limited to individuals having distribution authorization, wherein image querying indexed image subject matter comprises taking into account color schematics, contours, and patterns; and
   transmitting said electronic output to the source of said query if said source of query is within the authorized distribution.

14. The method in accordance with claim 13 wherein said subject matter extracted further comprises text.

15. The method in accordance with claim 13 wherein said stored indexed information is stored in said storage unit in encrypted form.

16. The method in accordance with claim 13 wherein said electronic output is said information.

17. A multifunction device comprising:
   a document scanner for scanning a document and converting the same to digital data form, said multifunction device configured to store electronic document copies in a memory;
   a digital processing unit in communication with said document scanner;
   a storage unit in association with said digital processing unit capable of storing said document in digital data form, wherein the storage unit is configured to digitally store information inputted by a user at the time of scanning the document with an electronic authorized distribution to limit access to the stored scanned document; and
   a program instruction set associated with said digital processing unit causing extraction of at least digital image subject information from said document scanned by said document scanner and indexing said digital data form of said document with said extracted digital subject information in said storage unit;
   wherein said program instruction set further causes output of said digital data form of said document in response to an image query for information pertaining to said extracted image subject matter, the query or output being limited to individuals having distribution authorization, wherein image querying indexed image subject matter comprises taking into account color schematics, contours, and patterns.

18. The multifunction device in accordance with claim 17 wherein said program instruction set limits output of said digital data form of said document based on an authorized distribution input provided along with a scanned document.

19. A system for providing information inputted by a user to persons authorized to review such information, said system comprising:
   (a) a plurality of multifunction devices communicatively coupled to a network, wherein at least one of said multifunction devices includes
      (i) a document scanner for scanning a document and converting the same to digital data form;
      (ii) a digital processing unit in communication with said document scanner;
      (iii) a storage unit in association with said digital processing unit capable of storing said document in digital data form in a memory and information inputted by a user at the time of scanning the document with an electronic authorized distribution to limit access to the stored scanned document; and
      (iv) a program instruction set associated with said digital processing unit configured to initiate extraction of at least digital image subject information from said scanned document, index said digital data form of said document with said extracted digital subject information in said storage unit, and output said digital data form of said document in response to an image query for information pertaining to said extracted image subject matter, the query or output being limited to individuals having distribution authorization, wherein image querying indexed image subject matter comprises taking into account color schematics, contours, and patterns;
   (b) at least one computer, communicatively coupled to said network, wherein said outputted digital data form of said document is delivered to source of said query for information.

20. The method in accordance with claim 13, wherein the query is an extemporaneous or prior query pertaining to the subject matter of said document.

* * * * *